US012585772B2

(12) United States Patent
Wuest et al.

(10) Patent No.: US 12,585,772 B2
(45) Date of Patent: Mar. 24, 2026

(54) MALICIOUS ACTIVITY DETECTION BY MODELING END-POINT EVENTS AS SEQUENCES

(71) Applicant: Acronis International GmbH, Schaffhausen (CH)

(72) Inventors: Candid Wuest, Bassersdorf (CH); Philipp Gysel, Bern (CH); Dinil Mon Divakaran, Singapore (SG); Andrey Ustyuzhanin, Singapore (SG); Kenneth Nwafor, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 176 days.

(21) Appl. No.: 18/470,237

(22) Filed: Sep. 19, 2023

(65) Prior Publication Data

US 2025/0094585 A1 Mar. 20, 2025

(51) Int. Cl.
| | |
|---|---|
| *G06F 21/00* | (2013.01) |
| *G06F 21/56* | (2013.01) |
| *G06N 3/047* | (2023.01) |

(52) U.S. Cl.
CPC .......... *G06F 21/566* (2013.01); *G06N 3/047* (2023.01); *G06F 2221/034* (2013.01)

(58) Field of Classification Search
CPC ...... G06N 3/047; G06N 20/00; G06F 21/566; G06F 2221/034
See application file for complete search history.

(56) References Cited

U.S. PATENT DOCUMENTS

| | | | |
|---|---|---|---|
| 9,667,641 | B2 | 5/2017 | Muddu et al. |
| 10,382,454 | B2 | 8/2019 | Avidan et al. |
| 11,250,126 | B2 | 2/2022 | Strogov et al. |
| 11,354,185 | B2 | 6/2022 | Korotaev et al. |
| 11,609,988 | B2 | 3/2023 | Strogov et al. |
| 2021/0064751 | A1* | 3/2021 | Li ....................... G06F 18/2413 |
| 2021/0176260 | A1 | 6/2021 | Pan et al. |
| 2022/0147631 | A1 | 5/2022 | Perfilev et al. |
| 2024/0061937 | A1* | 2/2024 | Camp .................. G06F 40/237 |

* cited by examiner

*Primary Examiner* — Tri M Tran
(74) *Attorney, Agent, or Firm* — ESPE Legal Consultancy FZ-LLC

(57) ABSTRACT

Systems and methods for detecting malicious activity on an endpoint, the endpoint having executing processes, including tracking behavior of executing processes, generating a provenance graph to group the behavior events, transforming the provenance graph into a sequence of behavior events, training a sequence classification machine learning model based on the sequence of behavior events, processing a sequence of test behavior events using the sequence classification machine learning model to generate a probability of maliciousness, and alerting for malicious activity when the probability of maliciousness for the sequence of test behavior events is greater than a threshold.

20 Claims, 6 Drawing Sheets

500

Monitor behavior of applications on endpoints 502

Generate provenance graph 504

Determine security-relevant features per event 506

Generate sequence of events 508

Train machine learning model on sequences 510

Determine maliciousness probability 512

Determine malware 514

100

200

500

Monitor behavior of applications on endpoints 502

Generate provenance graph 504

Determine security-relevant features per event 506

Generate sequence of events 508

Train machine learning model on sequences 510

Determine maliciousness probability 512

Determine malware 514

MALICIOUS ACTIVITY DETECTION BY MODELING END-POINT EVENTS AS SEQUENCES

TECHNICAL FIELD

Embodiments relate generally to malicious activity detection. More particularly, embodiments relate to malicious activity detection for system endpoints.

BACKGROUND

Detection of malicious activities at endpoints, for example, due to a malware infection, is a challenging problem due to the complex and evolving nature of malware. Many existing solutions implement rules to detect malicious behavior. Although fast and precise, rules are limited and focused on detecting only known malicious behaviors.

Moreover, with attackers finding new ways to breach security, and new malware being deployed every day, there is a need for intelligent systems that learn automatically to detect malicious activities, of both known and unknown malware, with minimal human intervention.

SUMMARY

Embodiments described or otherwise contemplated herein substantially meet the aforementioned needs of the industry. Embodiments described herein include systems and methods for detecting malicious activity by modeling end-point events as sequences. For example, embodiments are configured to create process provenance graphs from applications executing on a system. Next, sequences of events per provenance graph are created. A sequence classifier built using supervised machine learning can be used. A trend of maliciousness probability over a long period of time can therefore be tracked.

In a feature and advantage of embodiments, malicious activity can be detected in near-real time on endpoints, by generating alerts for two types of abnormal behavior. In a first type, a single sequence of events is predicted as malicious with high confidence. In a second type, multiple sequences of events can include a trend of maliciousness. Embodiments can therefore detect previously unseen malicious behavior even if the behavior is spread over smaller blocks of activities.

In another feature and advantage of embodiments, benign and malicious behaviors of endpoint activities can be learned by analyzing sequences of events of different kinds, such as process creation, file creations, network communications, registry key accesses, etc., using a machine learning (ML) model. In an embodiment, a model can track the behavior of correlated events over periods of time, including longer times than traditional systems.

In another feature and advantage of embodiments, a provenance graph can be built across multiple processes. The provenance graph can capture one or more relationships between different events and types of events on a system over long periods, in contrast to focusing on the behavior of a single event type or process as in traditional systems.

In another feature and advantage of embodiments, a provenance graph can be utilized to construct sequences of events and train a supervised classifier to predict malicious activities, in contrast to traditional systems that perform classification on features of a single behavior event.

In another feature and advantage of embodiments, a degree of maliciousness can be generated as output that is utilized in two specific ways. First, each sequence probability is matched against a threshold to raise an alert, and second, probabilities of multiple sequences are modeled as time series for trend analysis and detection of (potentially) slow changes in behavior.

In another feature and advantage of embodiments, a ML model can be retrained based on one or more of new behavioral data, analyst feedback, threat intelligence, or cloud-based emulation of benign and malicious applications. Thus, embodiments can learn behavior properties of benign endpoint systems and can be tailored to specific customers.

In an embodiment, a method of detecting malicious activity on a computer system, the computer system having a plurality of processes executing on the computer system, comprises: tracking behavior of the plurality of processes, wherein each of the plurality of processes includes a plurality of behavior events in interacting with the computer system; generating at least one provenance graph to group the plurality of behavior events, wherein the plurality of behavior events include at least two processes running in parallel; transforming at least one provenance graph into a sequence of behavior events; training a sequence classification machine learning model based on the sequence of behavior events; processing a sequence of test behavior events using the sequence classification machine learning model to generate a probability of maliciousness; and alerting for malicious activity when the probability of maliciousness for the sequence of test behavior events is greater than a threshold.

In an embodiment, a system for detecting malicious activity on an endpoint, the endpoint having a plurality of executing processes, comprises at least one processor operably coupled to memory; instructions that, when executed by the at least one processor, cause the at least one processor to implement: a monitoring engine configured to monitor behavior of the plurality of executing processes, wherein each of the plurality of executing processes includes a plurality of behavior events in interacting with the endpoint, a graphing engine configured to generate at least one provenance graph to group the plurality of behavior events, wherein the plurality of behavior events include at least two processes running in parallel, a representation engine configured to transform at least one provenance graph into a sequence of behavior events, a training engine configured to train a sequence classification machine learning model based on the sequence of behavior events, the sequence classification machine learning model configured to process a sequence of test behavior events to generate a probability of maliciousness, and a detection engine configured to alert for malicious activity when the probability of maliciousness for the sequence of test behavior events is greater than a threshold.

In an embodiment, a machine learning model comprises a neural network; and a deep learning algorithm executing on the neural network and trained based on a sequence of behavior events and configured to: receive a sequence of test behavior events generated from a provenance graph from a plurality of behavior events include at least two processes running in parallel, and generate a probability of maliciousness for the sequence of test behavior events.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
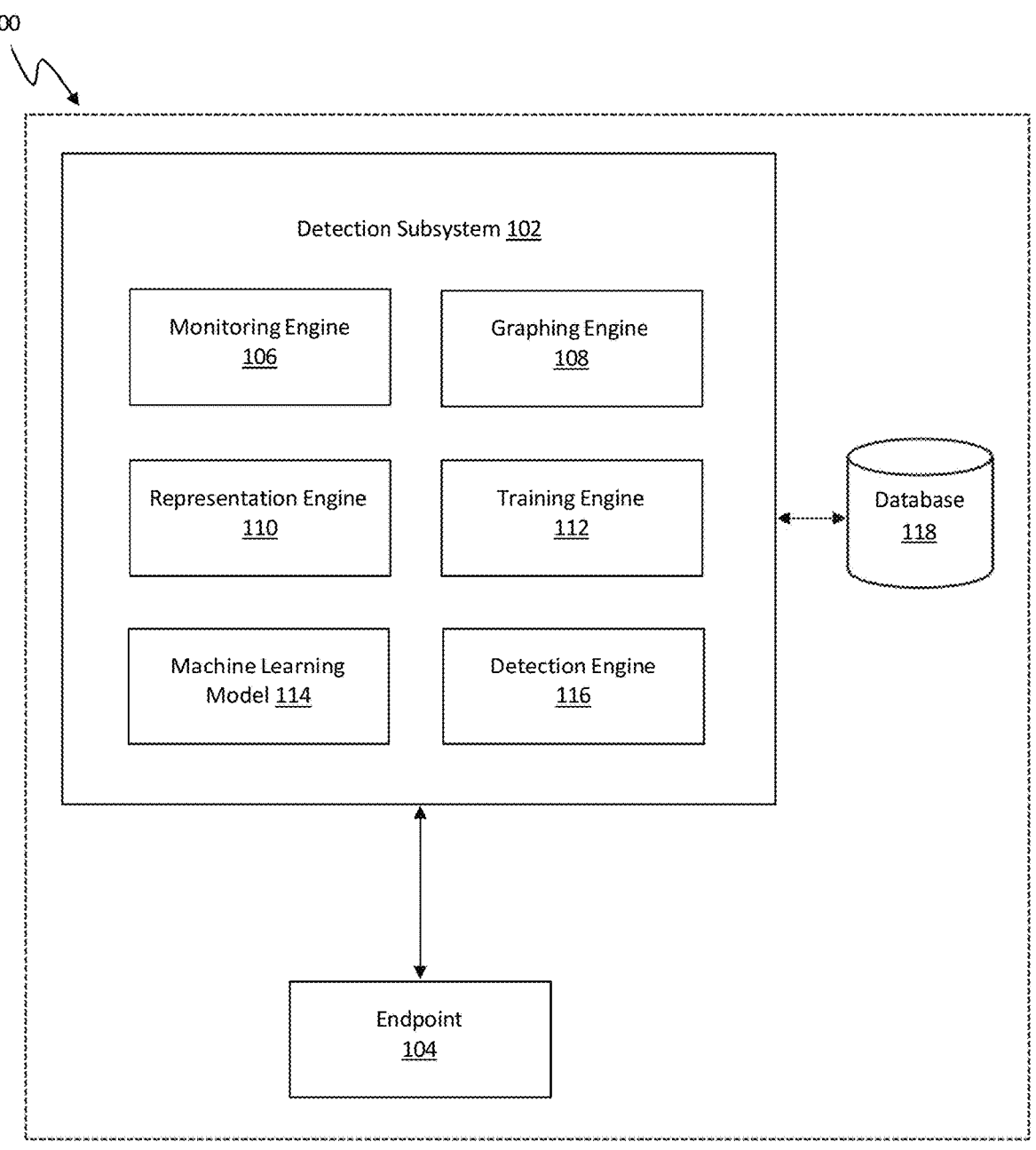
FIG. 1 is a block diagram of a system for detecting malicious activity, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for detecting malicious activity is depicted, according to an embodiment. System 100 generally comprises a detection subsystem 102 for protecting one or more endpoints, such as endpoint 104.

A system endpoint can be a physical device that connects to and exchanges information with a computer network. For example, endpoint 104 can be a mobile device, desktop computer, virtual machine, embedded device, or server. In further examples, endpoint 104 can be an Internet-of-Things (IoT) device such as a camera, lighting, refrigerator, security system, smart speaker, and thermostat.

Detection subsystem 102 is operably coupled to endpoint 104. Though detection subsystem 102 and endpoint 104 are depicted in FIG. 1 as separate components, detection subsystem 102 and its components or some of its components can be physically located on endpoint 102. In other embodiments, detection subsystem 102 is communicatively coupled to endpoint 104 such as over a communications network.

Embodiments described herein includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Detection subsystem 102 generally comprises a monitoring engine 106, a graphing engine 108, a representation engine 110, a training engine 112, a machine learning (ML) model 114, a detection engine 116, and a database 118.

On any given system (e.g. endpoint), a plurality of programs can be running in parallel. As described herein, detection subsystem 102 is configured to analyze each running application separately. However, computer programs can create new threads, new processes, write and start new files, etc. Accordingly, monitoring engine 106 is configured to monitor endpoints such as endpoint 104. In an embodiment, monitoring engine 106 is configured to monitor the behavior of applications on endpoint 104, including for new threads, processes, new files, and so on.

For example, monitoring engine 106 can itself comprise an endpoint detection and response (EDR) or extended detection and response (XDR) subsystem. Monitoring engine 106 can capture behavior represented by events, which include file system access, network connections, change in the registry, and other types of endpoint interaction. In an embodiment, monitoring engine 106 can store metadata (e.g. process ID) associated with each event.

In an embodiment, monitoring engine 106 is configured to track the behavior of all processes running on a given system (e.g. endpoint 104). In an embodiment, monitoring engine 106 can monitor a subset of processes on a system. Tracking happens at a low level, such as by tracking kernel API calls or operating system calls. By using low level tracking, obfuscation and defense evasion becomes harder for attackers. Monitoring data captured by monitoring engine 106 can be utilized for subsequent malware detection.

Graphing engine 108 is configured to generate one or more provenance graphs which capture the relationship between different processes running in parallel. A provenance graph allows for inference of whether two behavior events have a common parent process.

In order to account for applications creating new threads, new processes, writing and starting new files, etc. as mentioned above, a provenance graph is generated using data from monitoring engine 106. In an embodiment, events and metadata are used for the creation of a provenance graph. Accordingly, all interactions that originated from a given program can be tracked. For example, a WINDOWS Word application can start a Word macro, which starts a Power-Shell script, which in turn puts another application into the WINDOWS Startup folder. All such programs and files would then belong to one provenance graph. As will be described herein, detection subsystem thus analyzes all events in this graph.

In practice, all programs on a given operating system are started by a common operating system process (e.g. for Windows: winlogon.exe). However, it is desirable to avoid having all applications belong to the same graph. Therefore, graphing engine 108 can utilize a list of OS system applications that are excluded in generated graphs. As a result, all user applications are assigned to different graphs. In an embodiment, the list of OS system applications for exclusion can be predefined upon detection subsystem 102 instantiation. In an embodiment, the list of OS system applications for exclusion can be generated by graphing engine 108, for example, by reading system data of endpoint 104.

Representation engine 110 is configured to determine security-relevant features per event based on the behavior data collected by monitoring engine 106 and the provenance graph generated by graphing engine 108. Security-relevant features can include the download and execution of a new file, persistence creation for next startup, upload of large amount of data, and so on.

For example, monitoring engine 106 can monitor certain types of behavior events. The following are provided by way of example only, as many other types of behavior events can be monitored:

Process start: A new application is executed;
File system access: A file or folder is modified, written, deleted or read;
Network connections: Any access to the Internet with protocols such as TCP and UDP;
Registry access (Windows system): A registry key is written or read;
Process injection: a process injects into another one (e.g. via DLL injection, process hollowing, etc.);
Process end (termination of a process);
Thread start;
Thread pause;
Thread resume;
Change of file permissions (e.g. make a file executable);
Remote Procedure Call (RPC) used to call another process;
Write to a memory region of another process; or
A connection made to a local private IP.

Representation engine 110 utilizes a special set of features which are relevant from a security perspective. In an embodiment, the special set of features are defined for each event type. In an embodiment, such features can be predefined in representation engine 110 based on the recommendation of security analysts and threat hunters. In an embodiment, security features can be identified using a machine learning model. By combining the features of different events, maliciousness can be inferred. Such features can include for example:

A file gets downloaded and later executed (dropped binary);
Persistence is created via registry key;
Persistence is created via startup folder;
Sensitive data is accessed, like web browser credentials or crypto wallet data;
A PowerShell script is started with obfuscated or Base64-encoded parameters;
An executable is started from a temporary folder location;

A DNS lookup is performed for a suspicious domain;
A PowerShell script downloads an executable from the internet, and executes it in memory;
A PowerShell script is executed with high privileges (e.g. execution policy "Bypass"); or
An executable is started from a temporary folder (e.g. C:\Users\*\AppData\Local\Temp).

Representation engine 110 is further configured to create sequences of events from one or more provenance graphs. In an embodiment, all events originate from a common provenance graph. In an embodiment, the events are sorted by timestamp. As will be explained further with respect to FIG. 4, security features are captured for each event in the sequence of behavior events. In an embodiment, the provenance graph generated can capture all events monitored. However, representation engine 110 can selectively create sequences according to events associated with security features.

Representation engine 110 can implement the choice of the start and stop of event sequences. In an embodiment, representation engine 110 creates one sequence after each new process start. In an embodiment, representation engine 110 can choose particular events to serve as starting point for sequences or for inclusion in sequences. In another embodiment, representation engine 110 can select random starting points.

For example, an event sequence can be started at each process start. The event sequence can span a predefined, dynamic, or configurable number of events (e.g. 50, 100, 200, 500 events, as well as additional or fewer events). In another embodiment, certain special behavior events can be identified to begin a process sequence, like process injections or dropping and executing a binary. Event sequences can accordingly be defined such that those suspicious events are included in the sequence, but are not necessarily first in the sequence. In embodiments, sequences can be created, including overlapping sequences in certain embodiments, so that all events are covered in at least one sequence. Accordingly, the machine learning model can operate on one sequence at a time. In another example, an event counter can be utilized. An event counter can be incremented for certain event types and utilized to determine that a sequence has at least 3 different event types (e.g. file write, process start, registry key) and includes at least 50 events, in a particular example. In another example, the selection of an event sequence start can be a process creation as mentioned above, or can be a randomly selected event from the first X number of events, like the first 50, 100, 200, or 500 events, as well as additional or fewer events. The end event can be time or counter-based. For example, after a certain time has elapsed, such as 1 minute, 2 minutes, 5 minutes, 10 minutes, etc. have elapsed from the first the event time, or at least X number events have been added, like the first 50, 100, 200, or 500 events, the sequence can be ended.

In another embodiment, instead of using a sequence model, representation engine 110 can represent events using a graph-based model, such as a Graph Neural Network (GNN). For such a model, the graph itself forms the input (e.g. ML model 114). That is, ML model 114 is trained with large numbers of labeled graphs (labeled as malicious or benign). In graph-based models, different goals for training can be considered; for example to classify nodes as malicious or not, to classify edges, or to classify the whole graph.

As described further herein, ML model 114 can perform sequence classification using sequences. Accordingly, representation engine 110 generates such sequences of events. In particular, representation engine 110 gathers all particular events from one specific provenance graph, orders them according to the timestamps, and creates a linear list of events. For example, graphing engine 108 generates a provenance graph in real time, representation engine 110 constructs the sequences in real time, and whenever a sequence is "full", the sequence is run through a machine learning detection model (e.g. ML model 114). In certain embodiments, there is no "offline" processing after a given time period. In a specific example, using an event sequence length of 200, a sequence is typically built within a minute, depending on how much activity comes from a particular application. Next, that sequence is fed to the machine learning model. Embodiments can therefore detect malware as early as possible. Accordingly, as mentioned above, incoming events are constantly added to the graph and therefore to the sequence and as soon as the given end criteria is met, e.g. 200 events, then the sequence is analyzed.

In an embodiment, as mentioned above, each event is represented by security-relevant features, and this data can be represented as a sequence of high dimensional vectors. The data format of a sequence of high dimensional vectors is suitable for a long sequence classification machine learning model with attention (e.g., transformers or LSTM with attention). In an example, each behavior event gets represented by a fixed number of manually-created features (e.g. 15, 30, 50, 64, 100, or 200 such features, as well as additional or fewer features). In an embodiment, one-hot encoding leads to an increase of the feature dimension. For example, in an embodiment of 64 "raw" features, roughly 200 features are represented after one-hot encoding.

Training engine 112 is configured to train ML model 114 for malware detection. In an embodiment, training engine 112 is configured to train ML model 114 as a sequence classification model. Accordingly, the components of monitoring engine 106, graphing engine 108, and representation engine 110 and their respective outputs can be utilized to generate training data. Of course, monitoring engine 106, graphing engine 108, and representation engine 110 and their respective outputs can further be utilized for malware detection for endpoint 104 as described further herein.

Referring to training engine 112, in a preparation operation, training engine 112 is configured to pre-process the sequences of events generated by representation engine 110. Numerical features can be normalized and categorical features are turned into a one-hot-encoding format. In an embodiment, one-hot encoding in machine learning is the conversion of categorical information into a format that may be fed into machine learning algorithms to improve prediction accuracy. In an example, categorical variables can be changed in pre-processing by training engine 112 due to ML model 114 requiring numeric input variables. Categorical data can include nominal or ordinal data (allocation of integer values).

In an embodiment, each feature in the high dimensional feature vector is exactly of one type: categorical, numerical, or boolean. For each type, only one preprocessing step is utilized. Categorical features get one-hot encoded. Numerical features have normalization applied to get a normal standard distribution with mean 0 and standard deviation 1. Boolean features are turned into 1 (True) and 0 (False).

To do such preprocessing, a preprocessing engine is utilized (not depicted in FIG. 1), which receives and analyzes training data. Each feature is analyzed separately, and a preprocessing step is applied to each feature separately. For example, the preprocessing engine considers all the values of a particular numerical feature, computes the original mean and standard deviation of that number distribution, and then computes the required data transformation (shift+ scale) to achieve a standard normal distribution. For categorical data types, one-hot encoding is utilized.

During the training stage, the preprocessing engine is fed all data. The preprocessing engine is configured to determine the existing classes of a given feature. If there is one (unprocessed) feature which can take on N class types, there will be N (processed) features after one-hot encoding. Each new feature is either 0 or 1. There is always one '1' value, and all other values are '0'.

In an embodiment, training engine 112 can regularly retrain ML model 114. Accordingly, ML model 114 is continuously learning. For example, new behavior data can be captured by monitoring engine 106 and used by training engine 112 to retrain ML model 114. In another example, training engine 112 can further utilize analyst feedback as well as threat intelligence to retrain ML model 114. In an embodiment, training engine 112 can create annotated data by emulation benign and malicious applications in the cloud. Accordingly, ML model 114 can always learn about the latest threats. This approach offers the advantage of faster product updates and significant cost savings, as no security analysts are involved, who would be required to craft malware signatures manually.

ML model 114 is therefore configured to distinguish between benign and malicious activities in a probabilistic sense. For example, once ML model 114 has been trained on enough data (e.g. labeled, unlabeled, or a mix of labeled and unlabeled data), ML model 114 can determine benign and malicious activities. ML model 114 is thus configured to produce a maliciousness probability for a given event sequence. In an embodiment, ML model 114 can be implemented using a neural network and one or more deep learning algorithms.

Detection engine 116 is configured to evaluate one or more maliciousness probabilities produced by ML model 114 to generate alerts. For example, if the probability of a sequence is greater than a pre-defined threshold, detection engine 116 generates an alert indicating malicious activity. In an embodiment, detection engine 116 provides the evaluated sequence along with the alert. In another example, if the probability of a sequence is less than a pre-defined threshold, detection engine 116 determines benign activity and does not generate an alert.

The output probabilities generated by ML model 114 can also be stored in database 118. Database 118 is configured to store data related to detection subsystem 102. In an embodiment, detection subsystem 102 is operably coupled to a data storage such as database 118. Database 118 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions. In an embodiment, database 118 is also configured to store maliciousness probabilities from ML model 114. In embodiments, detection engine 116 can read data from database 118 to determine malware.

In an embodiment, detection engine 116 can analyze maliciousness probabilities as a time-series (e.g. from multiple maliciousness probabilities stored in database 118) to detect a trend of increasing probability of maliciousness over time. Such a trend can be detected using regression models, e.g., by fitting a linear model and checking if the slope is greater than a given threshold. If so, detection engine 116 generates an alert, along with the most recent sequences of events, to provide context of malicious activities.

Therefore, in an embodiment, detection engine 116 performs binary classification, (e.g. whether a program is malicious or not). In another embodiment, detection engine 116 can perform classification into different malware categories. For example, different thresholds can be utilized to be indicative of certain malware or categories of malware. In such embodiments, more fine-grained mitigation methods can be used.

More particularly, in a specific embodiment, detection engine 116 can utilize one of three different outcomes from the machine learning model. In Outcome 1 (Binary classification), the output of the ML model is either 0 or 1, for "benign" or "malicious."

In Outcome 2 (Probability score), the output is numeric between 0 and 1. Values close to 0 indicate benign application behavior, whereas values close to 1 indicate malicious behavior. A value at 0.5 indicates that the ML model is unsure about the intent of the behavior. So, with this approach, thresholds for alerts can be set. For example, given a threshold of 0.9 and a sequence that gets a score of 0.8, there would be no alert. Using probability scores also allows to aggregate scores over a certain period of time (e.g. 1 hour), and if there are many scores of say 0.8, one alone will not create an alert, but many such relatively high scores lead to an alert.

In Outcome 3 (Malware classification), the output of the ML model is a probability distribution for different malware types. For example, in the case of 3 malware types, the scores could be (10%, 10%, 80%) for (malware 1, malware 2, malware 3). For this approach, the training data requires as a label not only an indicator of "benign" vs. "malicious", but also for malware, the exact malware type. Malware types can include adware, fileless malware, viruses, worms, trojans, bots, ransomware, spyware, info stealer, rootkits, and advanced persistent threat (APT) attack. In another embodiment, types can correspond to families such as LockBit ransomware, AgentTesla downloader, and so on. In an embodiment, malware family classification can be achieved by using multiple models in sequence. For example, a first model can be used to determine if the sequence is malicious, and a second model can classify the family type.

As described herein, embodiments of detection subsystem 102 correlate the behavior of different programs using a provenance graph that is specific to a single executing instance of endpoint 104. In an embodiment, persistent providence graphs can be utilized to capture relationships across system restarts. Embodiments therefore allow for the tracking of malware which is inactive over longer periods of time, but which uses persistence to continue execution across several days.

In an embodiment, alerts of malicious sequences generated by detection engine 116 can be validated by a human user. Such validated alerts (e.g. alerts with ground truth), can be fed back to the detection subsystem 102. For example, training engine 112 can utilize validated alerts to learn and potentially improve detection accuracy. In an embodiment, detection subsystem 102 can also be trained to pick the most relevant sequences that should be validated by a human user. Picking the right sequences for analysis can help reduce the number of such validations.

Figure 2:
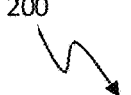
FIG. 2 is a flowchart of an example attack chain.
Figure 2:
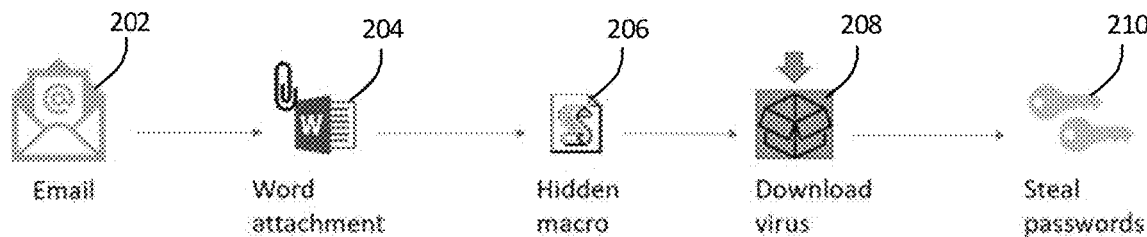

Referring to FIG. 2, a flowchart of an example attack chain 200 is depicted. Attack chain 200 can include an email 202 to one or more users. For example, with additional reference to FIG. 1, an email can be sent to a user of endpoint 104. Email 202 can further include a document attachment, such as a Word file 204. Within Word file 204 is a hidden macro 206. Once Word file 204 is opened, hidden macro 206 can be unknowingly executed by the user to download malware 208, such as a virus. The malware 208 can steal passwords 210 from users of endpoint 104.

Figure 3:
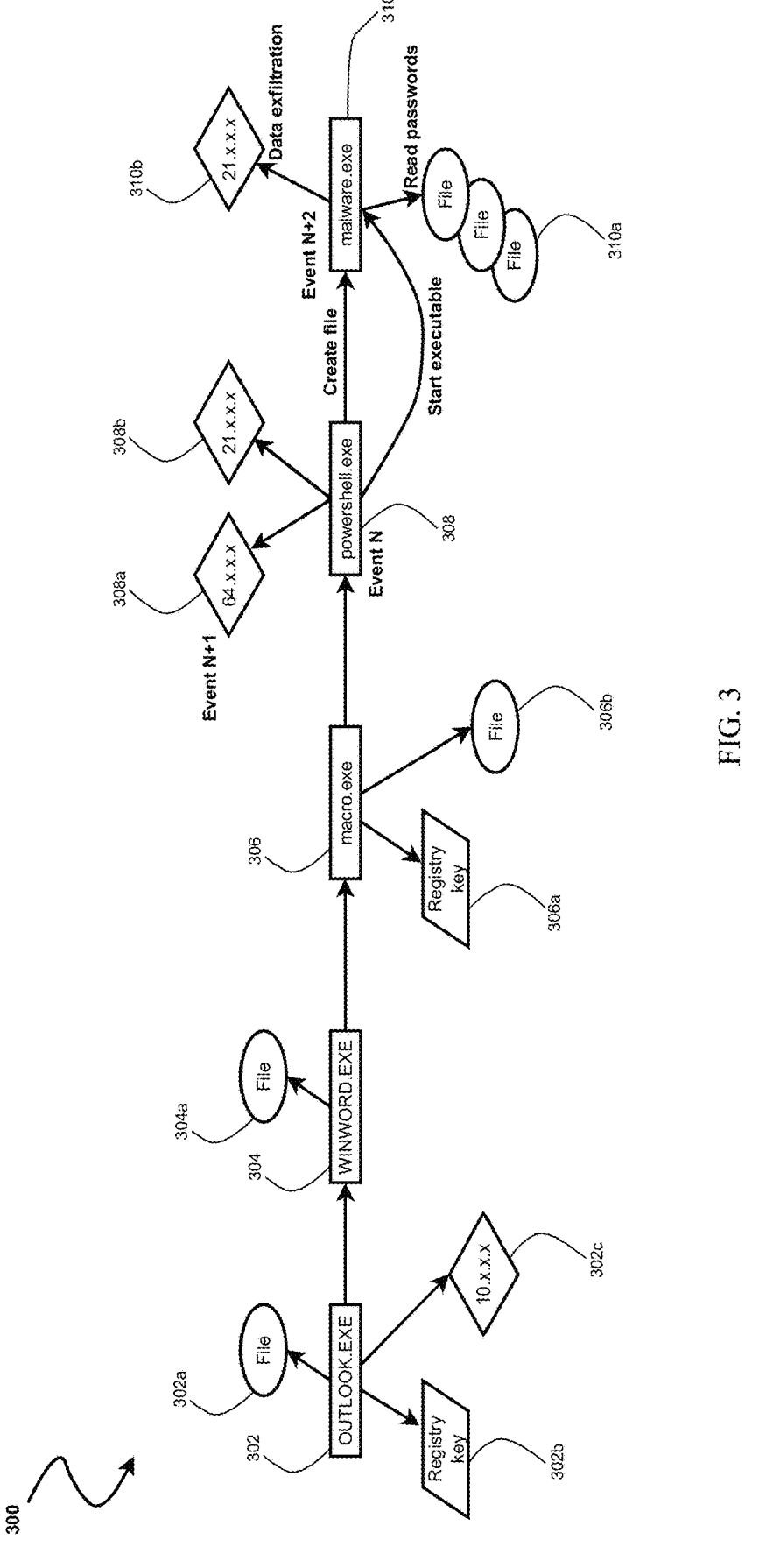
FIG. 3 is a block diagram of a provenance graph for the attack chain of FIG. 2A, according to an embodiment.

Referring to FIG. 3, a block diagram of a provenance graph 300 for the attack chain of FIG. 2 is depicted, according to an embodiment. In an embodiment, provenance graph 300 can be generated by graphing engine 108. In an embodiment, provenance graph 300 includes data of nodes (subjects and objects) and edges (operations of the subjects and objects).

For example, provenance graph 300 includes nodes reflective of example attack chain 200. Node 302 Outlook.exe is reflective of execution of the email program to receive email 202. Node 304 Winword.exe is reflective of execution of MICROSOFT Word executed to open Word file 204. Node 306 macro.exe is reflective of execution of hidden macro 206. Node 308 powershell.exe is reflective of execution of the command-line shell and associated script called by hidden macro 206. Node 310 malware.exe is reflective of malware 208 executed after download by hidden macro 206.

Provenance graph 300 further includes node 302a corresponding to an Outlook file, node 302b corresponding to a registry key used by Outlook, and node 302c corresponding to an IP address used by Outlook.

Provenance graph 300 further includes node 304a corresponding to a file used by Word (e.g. Word file 204 or a support file).

Provenance graph 300 further includes node 306a corresponding to a registry key used by hidden macro 206, and node 306b corresponding to a file used by hidden macro 206.

Provenance graph 300 further includes node 308a corresponding to a first IP address used by Powershell and node 308b corresponding to a second IP address used by Powershell. As will be described further, node 308 can be identified as Event N. Node 308a can be identified as Event N+1. Provenance graph 300 further includes edges from node 308 to node 310 corresponding to the operations of creating a file and starting executable malware.exe.

Provenance graph 300 further includes node 310a corresponding to one or more files accessed by malware 208 and node 310b corresponding to an IP address used by malware 208. Node 310 can be identified as Event N+2. Provenance graph 300 further includes edges corresponding to the operation of reading passwords at node 310a and the operation of exfiltrating that password data at node 310b to an external IP address to steal data from endpoint 104.

Figure 4:
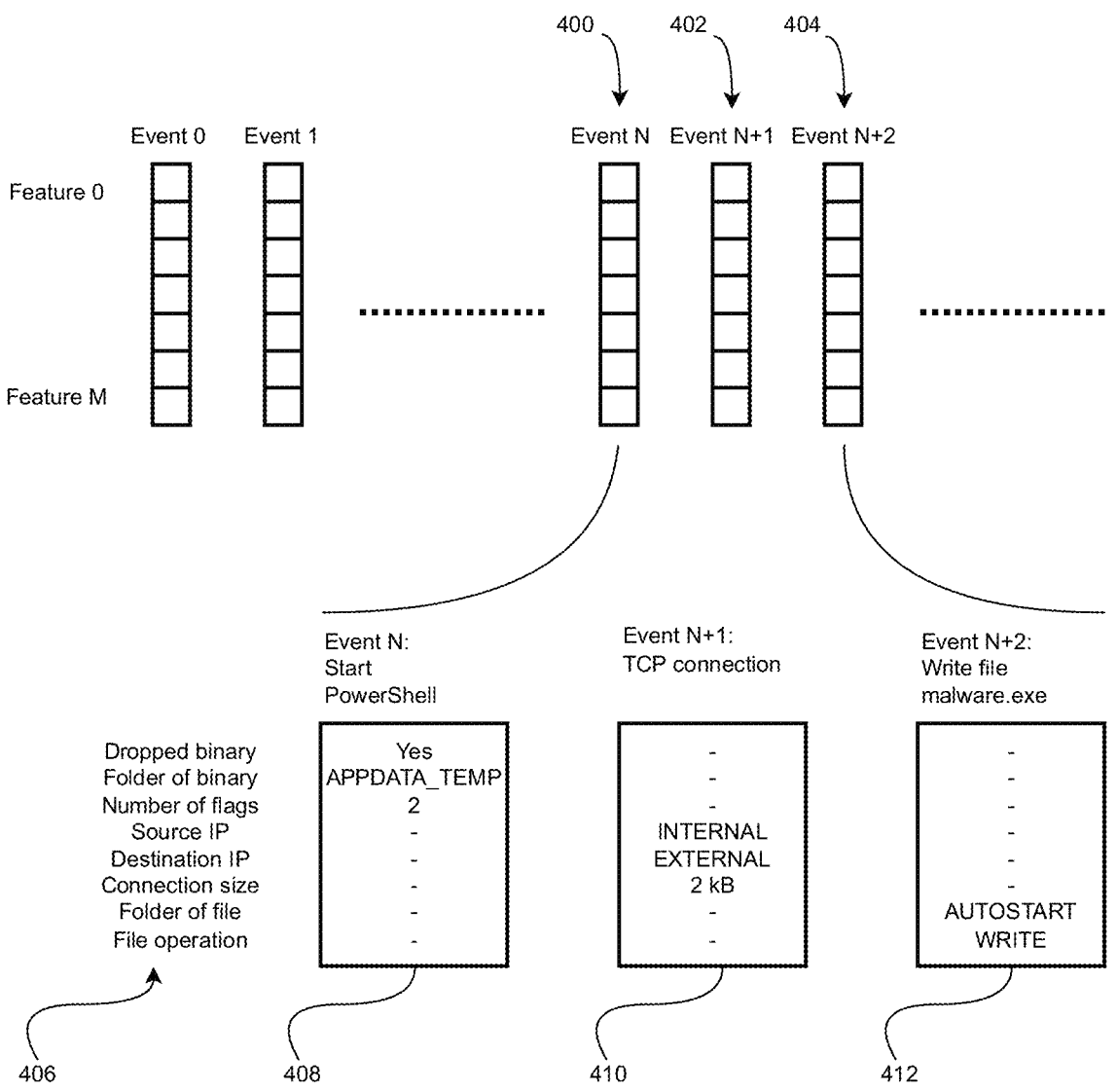
FIG. 4 is a block diagram of a sequence of behavior events, according to an embodiment.

Referring to FIG. 4, a block diagram of a sequence of behavior events for the attack chain of FIG. 2 is depicted, according to an embodiment. Though renumbered for ease of explanation, Event N 400 corresponds to Event N in FIG. 3 (node 308), Event N+1 402 corresponds to Event N+1 in FIG. 3 (node 308a), and Event N+2 corresponds to Event N+2 in FIG. 3 (node 310).

List of security features 406 illustrates all of the security features for which representation engine 110 can include in its generation of a sequence. For example, list of security features 406 can include dropped binary, folder of binary, number of flags, source IP, destination IP, connection size, folder of file, and file operation.

The sequence of behavior events can include for Event N 400 as the start of Powershell, features 408 (dropped binary: "Yes", folder of binary: "APPDATA_TEMP", and number of flags: "2"). The sequence of behavior events can include for Event N+1 402 as a TCP connection initiation by Powershell, features 410 (source IP: "INTERNAL", destination IP: "EXTERNAL", and connection size: "2 kb"). The sequence of behavior events can include for Event N+2 404 as a write file of malware.exe, features 410 (folder of file operation: "AUTOSTART" and file operation: "WRITE"). Though not depicted in FIG. 4, events and features can include respective timestamps indicating their occurrence in endpoint 104.

In an embodiment, events and corresponding data (such as features and timestamps) can be stored in a linear data structure such as an array, a linked list, a stack, or a queue. Events and corresponding data can also be stored in a flat text file.

Figure 5:
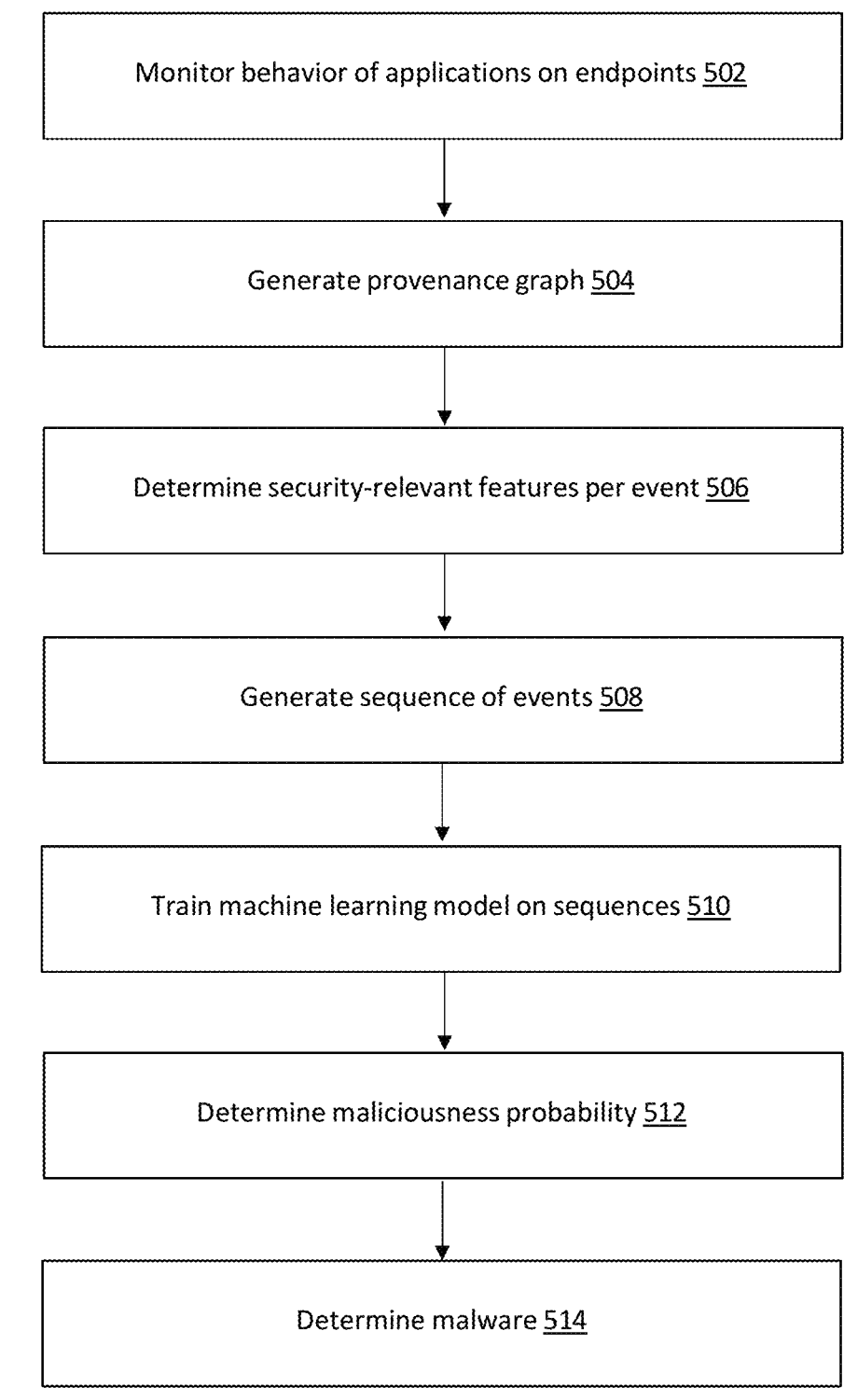
FIG. 5 is a flowchart of a method for detecting malicious activity, according to an embodiment.

Referring to FIG. 5, a flowchart of a method 500 for detecting malicious activity is depicted, according to an embodiment. In an embodiment, method 500 can be implemented by system 100, and more particularly, detection subsystem 102.

At 502, method 500 comprises monitoring behavior of applications on endpoints. For example, monitoring engine 106 can monitor behavior on endpoint 104, including behavior of one or more applications executing on endpoint 104.

At 504, method 500 further comprises generating one or more provenance graphs. For example, graphing engine 108 can generate a provenance graph using data from monitoring engine 106.

At 506, method 500 further comprises determining security-relevant features per event. For example, representation engine 110 can determine security-relevant features per event based on the behavior data collected by monitoring engine 106 and the provenance graph generated by graphing engine 108.

At 508, method 500 further comprises generating a sequence of events. For example, representation engine 110 can create sequences of events, wherein the events originate from a common provenance graph.

At 510, method 500 further comprises training a machine learning model on sequences of events. For example, training engine 112 can train ML model 114 as a sequence classification model. In an embodiment, training engine 112 can utilize data associated with monitoring engine 106, graphing engine 108, and/or representation engine 110, as well as data from database 118, and previous detection engine 116 determinations to train ML model 114.

At 512, method 500 further comprises determining a maliciousness probability based on the trained machine learning model. For example, ML model 114 can receive a sequence of events under test, and, based on its training, determine a maliciousness probability for the sequence of events under test. At 512, the maliciousness probability is also stored. For example, the maliciousness probability can be stored in database 118 for subsequent evaluation by detection engine 116 with additional maliciousness probabilities over time.

At 514, method 500 further comprises determining malware. For example, detection engine 116 can evaluate one or more maliciousness probabilities produced by ML model 114 to generate an alert. For example, if the probability of a sequence is greater than a pre-defined threshold, detection engine 116 can generate an alert indicating malicious activity.

Figure 6:
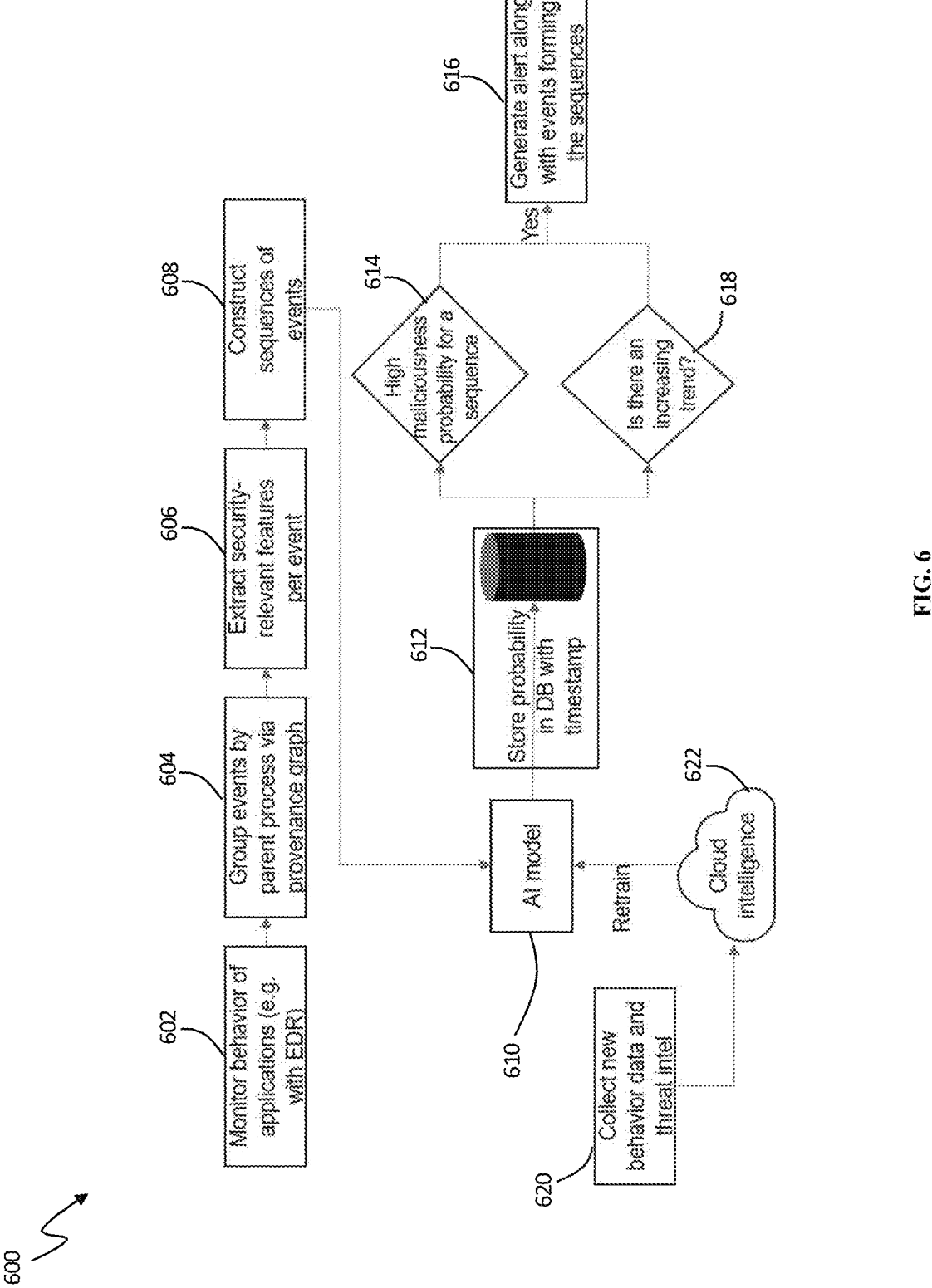
FIG. 6 is a flowchart of a method for detecting malicious activity, according to an embodiment.

Referring to FIG. 6, a flowchart of a method 600 for detecting malicious activity is depicted, according to an embodiment. In an embodiment, method 600 can be implemented by system 100, and more particularly, detection subsystem 102.

At 602, method 600 comprises monitoring the behavior of one or more applications. In an embodiment, an EDR can be utilized. With reference to detection subsystem 102, monitoring engine 106 can monitor the behavior of one or more applications executing on a computing system, such as endpoint 104.

At 604, method 600 further comprises grouping events by parent process using a provenance graph. For example, graphing engine 108 can group events according to a provenance graph.

At 606, method 600 further comprises extracting security-relevant features per event. For example, representation engine 110 can extract security-relevant features from a provenance graph.

At 608, method 600 further comprises constructing sequences of events. For example, representation engine 110 can construct sequences of events based on an evaluation of the events from a provenance graph.

At 610, method 600 further comprises receiving the sequences of events by a trained AI model. For example, representation engine 110 can output one or more sequences of events for receipt by ML model 114 (after training by training engine 112). Further at 610, the AI model can generate one or more maliciousness probabilities. For example, ML model 114 can generate a maliciousness probability based on the sequence of events generated by representation engine 110.

At 612, method 600 further comprises storing the maliciousness probability in a database with a timestamp. For example, ML model 114 can store the maliciousness probability and timestamp in database 118.

At 614, method 600 further comprises evaluating maliciousness based on a maliciousness probability for a sequence against a high value of maliciousness probability. For example, detection engine 116 can compare the maliciousness probability stored in database 118 against one or more thresholds.

At 616, method 600 further comprises generating an alert including the events forming the sequence when the maliciousness probability is above the threshold. For example, detection engine 116 can notify the user, endpoint 104, or other component or system with an indication of the alert and the sequence of events associated with the determination of malware.

At 618, method 600 further comprises evaluating maliciousness based on a plurality of maliciousness probabilities for a plurality of sequences against a trend threshold. For example, detection engine 116 can compare multiple maliciousness probabilities stored with associated timestamps or relative event timing stored in database 118 against a trend threshold. Again, at 616, detection engine 116 can notify the user, endpoint 104, or other component or system with an indication of the alert and one or more of the plurality of sequences associated with the determination of the trend of malware.

At 620, method 600 further comprises collecting new behavior data and threat intelligence. For example, monitoring engine 106 can collect new behavior data with which training engine 112 can re-train ML model 114. In another example, training engine 112 can itself receive new behavioral data, analyst feedback, and threat intelligence for retraining of ML model 114.

At 622, method 600 further comprises implementing cloud-based intelligence for retraining of the AI model. For example, training engine 112 can receive or otherwise execute cloud-based emulation of benign and malicious applications, including those specific to endpoint 104.

Accordingly, embodiments of the ML model 114 algorithm can learn behavior properties of endpoint 104 and can be tailored to specific customers.

The invention claimed is:

1. A method of detecting malicious activity on a computer system, the computer system having a plurality of processes executing on the computer system, the method comprising:

tracking behavior of the plurality of processes, wherein each of the plurality of processes includes a plurality of behavior events in interacting with the computer system, wherein the plurality of processes includes a sequential chain including a first process associated with a first executable and a second process associated with a second executable, wherein the first executable and the second executable are different, and wherein the plurality of behavior events includes an event originating from the first process and an event originating from the second process;

generating at least one provenance graph to group the plurality of behavior events, wherein the plurality of behavior events include at least two processes running in parallel;

transforming at least one provenance graph into a sequence of behavior events;

training a sequence classification machine learning model based on the sequence of behavior events, wherein the sequence of behavior events are derived from the at least one provenance graph;

processing a sequence of test behavior events using the sequence classification machine learning model to generate a probability of maliciousness; and alerting for malicious activity when the probability of maliciousness for the sequence of test behavior events is greater than a threshold, wherein the threshold includes a trend of maliciousness, and wherein alerting for malicious activity includes evaluating, against the trend of maliciousness, the probability of maliciousness and a plurality of probabilities of maliciousness for a plurality of other sequences of event behaviors to determine an increasing probability of maliciousness over time based on a relationship between the probability of maliciousness and at least one of the plurality of probabilities of maliciousness for the plurality of other sequences of event behaviors, wherein at least one of the sequence of test behavior events or the plurality of other sequences of event behaviors are undetected as malicious alone.

2. The method of claim 1, wherein the plurality of behavior events includes at least one of a process start, a file system access, a network connection, or a registry access.

3. The method of claim 1, further comprising:

determining security-relevant features for each event in the plurality of behavior events; and representing the security-relevant features for each event in the plurality of behavior events as a high-dimensional vector.

4. The method of claim 1, further comprising determining metadata for each of the plurality of behavior events, wherein generating the at least one provenance graph includes using the metadata.

5. The method of claim 1, wherein transforming the at least one provenance graph into the sequence of behavior events includes:

gathering all of the plurality of behavior events from a particular provenance graph;

ordering all of the plurality of behavior events from the particular provenance graph according to timestamps; and creating a linear list of all of the plurality of behavior events.

6. The method of claim 1, wherein the sequence of behavior events is created after each new process start.

7. The method of claim 1, further comprising randomly selecting an additional event to serve as a starting point for the sequence of behavior events.

8. The method of claim 1, wherein the tracking the behavior of the plurality of processes includes at least one of monitoring a kernel API call or an operating system call.

9. The method of claim 1, further comprising determining the malicious activity as one of a plurality of malware categories.

10. A system for detecting malicious activity on an endpoint, the endpoint having a plurality of executing processes, the system comprising:

at least one processor operably coupled to memory;

instructions that, when executed by the at least one processor, cause the at least one processor to implement:

a monitoring engine configured to monitor behavior of the plurality of executing processes, wherein each of the plurality of executing processes includes a plurality of behavior events in interacting with the endpoint, wherein the plurality of executing processes includes a sequential chain including a first process associated with a first executable and a second process associated with a second executable, wherein the first executable and the second executable are different, and wherein the plurality of behavior events includes an event originating from the first process and an event originating from the second process, a graphing engine configured to generate at least one provenance graph to group the plurality of behavior events, wherein the plurality of behavior events include at least two processes running in parallel, a representation engine configured to transform at least one provenance graph into a sequence of behavior events, a training engine configured to train a sequence classification machine learning model based on the sequence of behavior events, wherein the sequence of behavior events are derived from the at least one provenance graph, the sequence classification machine learning model configured to process a sequence of test behavior events to generate a probability of maliciousness, and a detection engine configured to alert for malicious activity when the probability of maliciousness for the sequence of test behavior events is greater than a threshold, wherein the threshold includes a trend of maliciousness, and wherein alerting for malicious activity includes evaluating, against the trend of maliciousness, the probability of maliciousness and a plurality of probabilities of maliciousness for a plurality of other sequences of event behaviors to determine an increasing probability of maliciousness over time based on a relationship between the probability of maliciousness and at least one of the plurality of probabilities of maliciousness for the plurality of other sequences of event behaviors, wherein at least one of the sequence of test behavior events or the plurality of other sequences of event behaviors are undetected as malicious alone.

11. The system of claim 10, wherein the representation engine is further configured to:
  determine security-relevant features for each event in the plurality of behavior events; and represent the security-relevant features for each event in the plurality of behavior events as a high-dimensional vector.

12. The system of claim 10, wherein the monitoring engine is further configured to determine metadata for each of the plurality of behavior events, and wherein the graphing engine is further configured to generate the at least one provenance graph using the metadata.

13. The system of claim 10, wherein the representation engine is configured to transform the at least one provenance graph into the sequence of behavior events including:
  gathering all of the plurality of behavior events from a particular provenance graph;
ordering all of the plurality of behavior events from the particular provenance graph according to timestamps; and
  creating a linear list of all of the plurality of behavior events.

14. The system of claim 10, wherein the representation engine is further configured to create the sequence of behavior events after each new process start.

15. The system of claim 10, wherein the representation engine is further configured to create the sequence of behavior events by randomly selecting an additional event to serve as a starting point for the sequence of behavior events.

16. The system of claim 10, wherein the monitoring engine is configured to monitor behavior of the plurality of executing processes by at least one of monitoring a kernel API call or an operating system call.

17. The system of claim 10, wherein the detection engine is further configured to determine the malicious activity as one of a plurality of malware categories.

18. The method of claim 1, wherein the probability of maliciousness and the plurality of probabilities of maliciousness are considered together in a time-series evaluation against the trend of maliciousness.

19. The method of claim 18, wherein evaluating, against the trend of maliciousness includes applying a regression model to the probability of maliciousness and the plurality of probabilities of maliciousness.

20. The method of claim 1, wherein previously undetected malicious activity is detected as malicious based on the probability of maliciousness and the plurality of probabilities of maliciousness considered together.

* * * * *